(12) United States Patent
Kikuchi et al.

(10) Patent No.: US 7,855,794 B2
(45) Date of Patent: Dec. 21, 2010

(54) PROXY PRINTING SYSTEM, INFORMATION PROCESSING APPARATUS, AND CONTROLLING METHOD

(75) Inventors: Koji Kikuchi, Kanagawa (JP); Noriyoshi Kurotsu, Kanagawa (JP); Masamichi Ohshima, Tokyo (JP); Hidekazu Morooka, Kanagawa (JP); Takashi Yagita, Kanagawa (JP); Koichiro Wanda, Kanagawa (JP); Kei Kitagata, Kanagawa (JP); Hiroyuki Kayama, Kanagawa (JP); Kenichi Shirai, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1090 days.

(21) Appl. No.: 11/001,538

(22) Filed: Dec. 1, 2004

(65) Prior Publication Data

US 2005/0141014 A1 Jun. 30, 2005

(30) Foreign Application Priority Data

Dec. 3, 2003 (JP) ............................. 2003-405030

(51) Int. Cl.
*G06F 3/12* (2006.01)
*H04N 1/00* (2006.01)

(52) U.S. Cl. ............... 358/1.14; 358/1.15; 358/408; 358/425

(58) Field of Classification Search ....... 358/1.13–1.18, 358/1.9, 408, 425
See application file for complete search history.

(56) References Cited

U.S. PATENT DOCUMENTS

| | | | | |
|---|---|---|---|---|
| 6,452,692 | B1 * | 9/2002 | Yacoub | 358/1.15 |
| 7,180,619 | B2 * | 2/2007 | Ferlitsch | 358/1.15 |
| 7,277,194 | B2 * | 10/2007 | Wanda | 358/1.15 |
| 2002/0089692 | A1 | 7/2002 | Ferlitsch | |
| 2002/0186410 | A1 | 12/2002 | Tanaka | |
| 2003/0076524 | A1 * | 4/2003 | Wanda | 358/1.14 |
| 2003/0174359 | A1 * | 9/2003 | Gomi | 358/1.15 |
| 2003/0217201 | A1 | 11/2003 | Gargi et al. | |

FOREIGN PATENT DOCUMENTS

JP 07-31165 A 11/1995

* cited by examiner

*Primary Examiner*—James A Thompson
(74) *Attorney, Agent, or Firm*—Canon U.S.A., Inc. I.P. Division (57) ABSTRACT

In a proxy printing system, one print job is transmitted to a first one of printers connected over a network, and when a print failure occurs in the first printer, a second networked printer processes the print job to perform proxy printing. The system detects a failure of the first printer attempting to process the print job and issues a notification. In accordance with managed history information for the first printer, the proxy printing system detects whether a printer that has previously processed a print job as a proxy for the first printer exists out of the networked printers. The system issues a notification indicating at least one detected printer as a proxy destination candidate. The system performs control so that the printer is used to execute proxy print processing, and updates the history management table after the execution of the proxy print processing.

13 Claims, 11 Drawing Sheets

| TARGET USER | TARGET PRINTER | PREVIOUS PROXY-DETERMINATION PRINTER |
|---|---|---|
| USER A | C3200 | LBP2810 |
| | PRINTER A | PRINTER B |
| ... | ... | ... |
| USER B | C3200 | NA |
| | PRINTER A | PRINTER C |
| ... | ... | ... |

FIG. 11

| TARGET USER | TARGET PRINTER | PROXY-DETERMINATION PRINTER 1 | PROXY-DETERMINATION PRINTER 2 | PROXY-DETERMINATION PRINTER 3 |
|---|---|---|---|---|
| USER A | C3200 | LBP2810: 4 | PRINTER A: 2 | PRINTER B: 1 |
| | PRINTER A | PRINTER B: 5 | LBP2810: 3 | C3200: 1 |
| ... | ... | ... | | |
| USER B | C3200 | NA | PRINTER B: 3 | C3200: 2 |
| | PRINTER A | PRINTER C: 4 | ... | |
| ... | ... | | | |

PROXY PRINTING SYSTEM, INFORMATION PROCESSING APPARATUS, AND CONTROLLING METHOD

BACKGROUND OF THE INVENTION

1. Field of the Invention

The present invention relates to display technology for a networked personal computer during manual proxying for proxy printing, when a print failure occurs in a printer device that has received a print instruction from a data supply source such as the computer.

2. Description of the Related Art

In recent years, typically, printer devices connected to a network are commonplace and many printer devices can be networked for use. In such an environment, when a print failure occurs in a printer device to which a print instruction is issued, the printer user typically wishes to use the print information as soon as possible, rather than removing the print failure at that point. In order to meet the demand, a "proxy printing function" has been achieved which outputs print job information left unprinted to another printer device.

For example, Japanese Patent Laid-Open No. 2003-271354 discloses a print processing apparatus that determines whether or not automatic proxy printing is designated and switches between automatic proxy printing and manual proxy printing. When it is determined that automatic proxy printing is designated, the print processing apparatus executes automatic proxy printing, and, otherwise, performs manual proxy printing.

With the "proxy printing function" described above, however, when a print failure occurs in a printer device to which a print instruction has been given, during selection of a printer device as a proxy print destination for manual proxy printing, all printer devices that are currently registered are displayed as candidates. Thus, there is a problem in that the user has to select the proxy print destination for each proxy printing operation. This is also true for the print processing apparatus disclosed in Japanese Patent Laid-Open No. 2003-271354.

SUMMARY OF THE INVENTION

The present invention has been made to overcome the above problem, and provides a proxy printing system that can eliminate complicated user operations at a personal computer when a print failure occurs in a printer device at a proxy print destination.

A proxy printing system is provided that allows a personal computer to exclude the designation of a printer device that is determined as a proxy print destination but is unable to perform printing.

According to an aspect of the present invention, a proxy printing system that performs processing for, when a print job is transmitted to a first one of printers connected over a network and a print failure occurs in the first printer, causing a second one of the printers connected over the network to perform proxy printing on the print job. The proxy printing system includes: a failure detecting unit for detecting the failure of the first printer attempting to process the print job; a failure notifying unit for notifying of the failure of the first printer; a history managing unit for managing history of the first printer; and a proxy history detecting unit for detecting, out of the printers, a presence of at least one printer that has previously proxied the first printer to process a print job based on the history of the first printer managed by the history managing unit. The proxy printing system further includes: a proxy destination candidate notifying unit for issuing a notification indicating at least one of the printers detected by the proxy history detecting unit, as a proxy destination candidate; a proxy print processing controlling unit for performing control to execute proxy print processing using the printer detected by the proxy destination candidate notifying unit; and a history updating unit for updating the history managing unit after the proxy print processing is executed.

Other features and advantages of the present invention will be apparent from the following description taken in conjunction with the accompanying drawings, in which like reference characters designate the same or similar parts throughout the figures thereof.

DESCRIPTION OF THE EMBODIMENTS

A proxy printing system according to embodiments of the present invention is described below with reference to the attached drawings.

Figure 1:
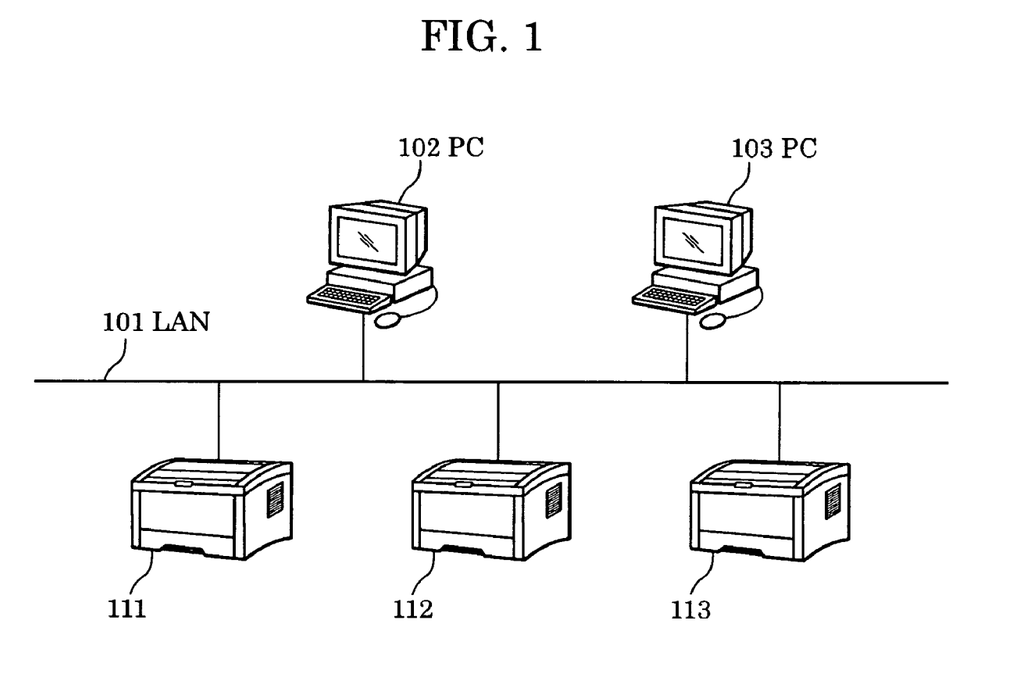
FIG. 1 is a block diagram of a network system according to the present invention.

FIG. 1 is a block diagram showing of an exemplary proxy printing system including printers and personal computers according to embodiments of the present invention.

Referring to FIG. 1, personal computers (PCs) 102 and 103 and first, second, and third network printers 111, 112, and 113 are connected to a local area network (LAN) 101.

In the present embodiment, each of the PCs 102 and 103 functions as an output control apparatus and each of the network printers 111, 112, and 113 functions as a printer device. They are interconnected through the LAN 101. While only two PCs 102 and 103 are illustrated in FIG. 1, the printing system may include a plurality of PCs used for executing a procedure in the present embodiment by sharing or in combination.

While the present embodiment is described in conjunction with the example of the network printers 111, 112, and 113, a system for changing an output destination is not limited to what is described in the present embodiment. Thus, the system may be selected independently of a scheme for connecting the printer devices (e.g., network printers) and a host computer.

Figure 2:
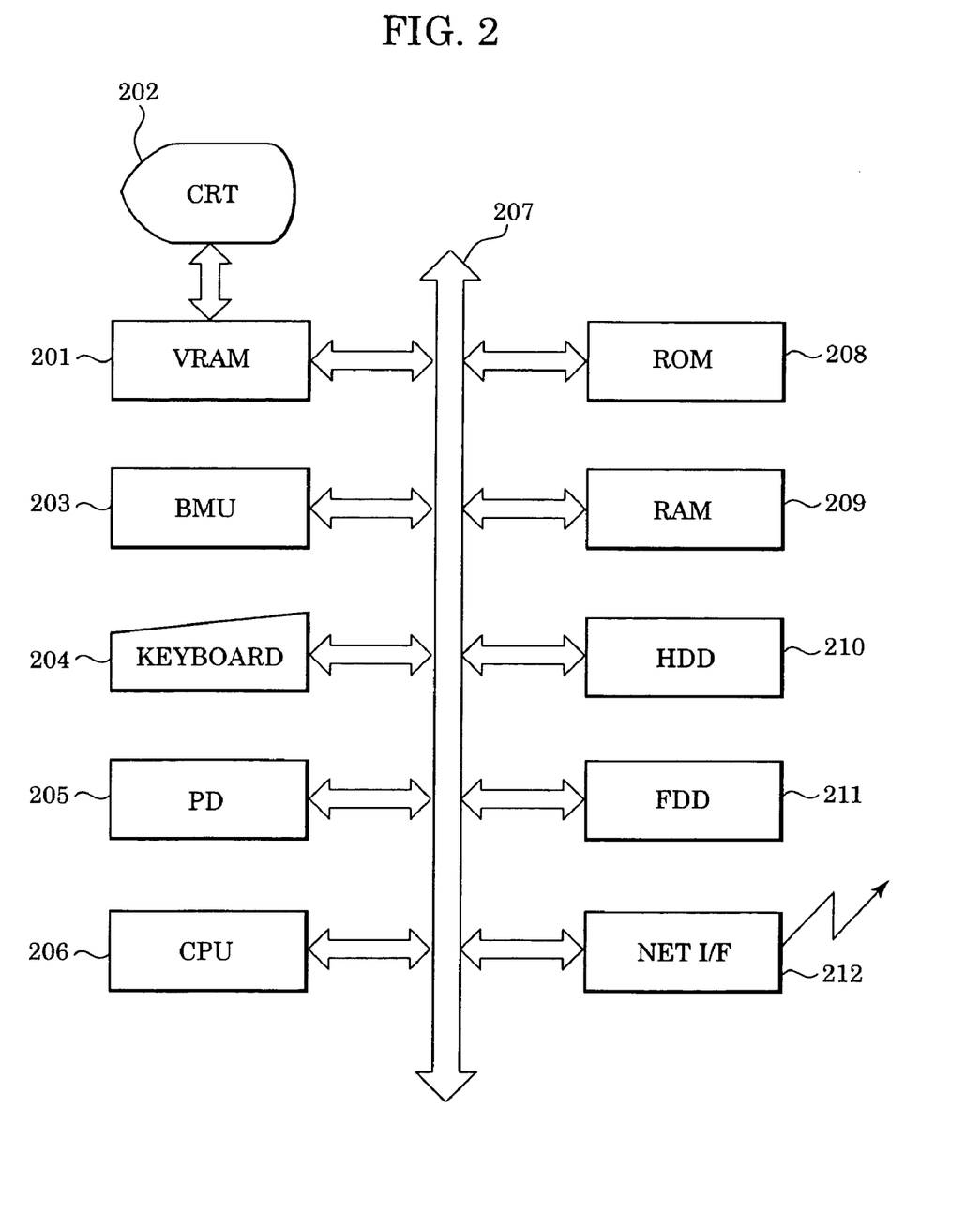
FIG. 2 is a block diagram showing an example of the configuration of a personal computer (PC) according to the present invention.

FIG. 2 schematically illustrates the configuration of each of the PCs 102 and 103 shown in FIG. 1. Referring to FIG. 2, a VRAM (video random access memory) 201 loads and stores text and an image, which are displayed on the screen of a CRT (cathode ray tube) display device 202. A bit move unit (BMU) 203 controls data transfer between memories or between a memory and each unit. A keyboard 204 has various input keys. A pointing device (PD) 205 is used to point to an icon or the like on the screen. A CPU (central processing unit) 206 controls individual units of this apparatus in accordance with control programs stored in a ROM (read-only memory) 208. Examples of the control programs include a program according to a program, an error processing program, and a program (described below) for achieving the present invention. A RAM (random access memory) 209 is used as a work area when the CPU 206 executes each program and is also used as a temporary save area during error processing. A hard disk drive (HDD) 210 and a floppy disk drive (FDD) 211 are provided to store an application program described below, library, data, etc. A network interface (NET I/F) 212 performs data control and diagnosis over a network to transmit/receive data to/from another apparatus through the network. The above described units are interconnected via an input/output bus 207, which includes an address bus, a data bus, and a control bus.

With this configuration, when the apparatus is powered on, the CPU 206 initializes the apparatus in accordance with a boot program stored in the ROM 208 to load an OS (operating system) from the HDD 210. Thereafter, the CPU 206 can run various types of application programs and so on. Since the apparatus of the present embodiment is based on a general-purpose information processing apparatus (e.g., personal computer or the like), the programs are typically stored on the hard disk or the like. The programs may also be stored in the ROM 208. That is, the present invention does not restrict the storage medium for storing the programs.

Processing for Print Job

Figure 3:
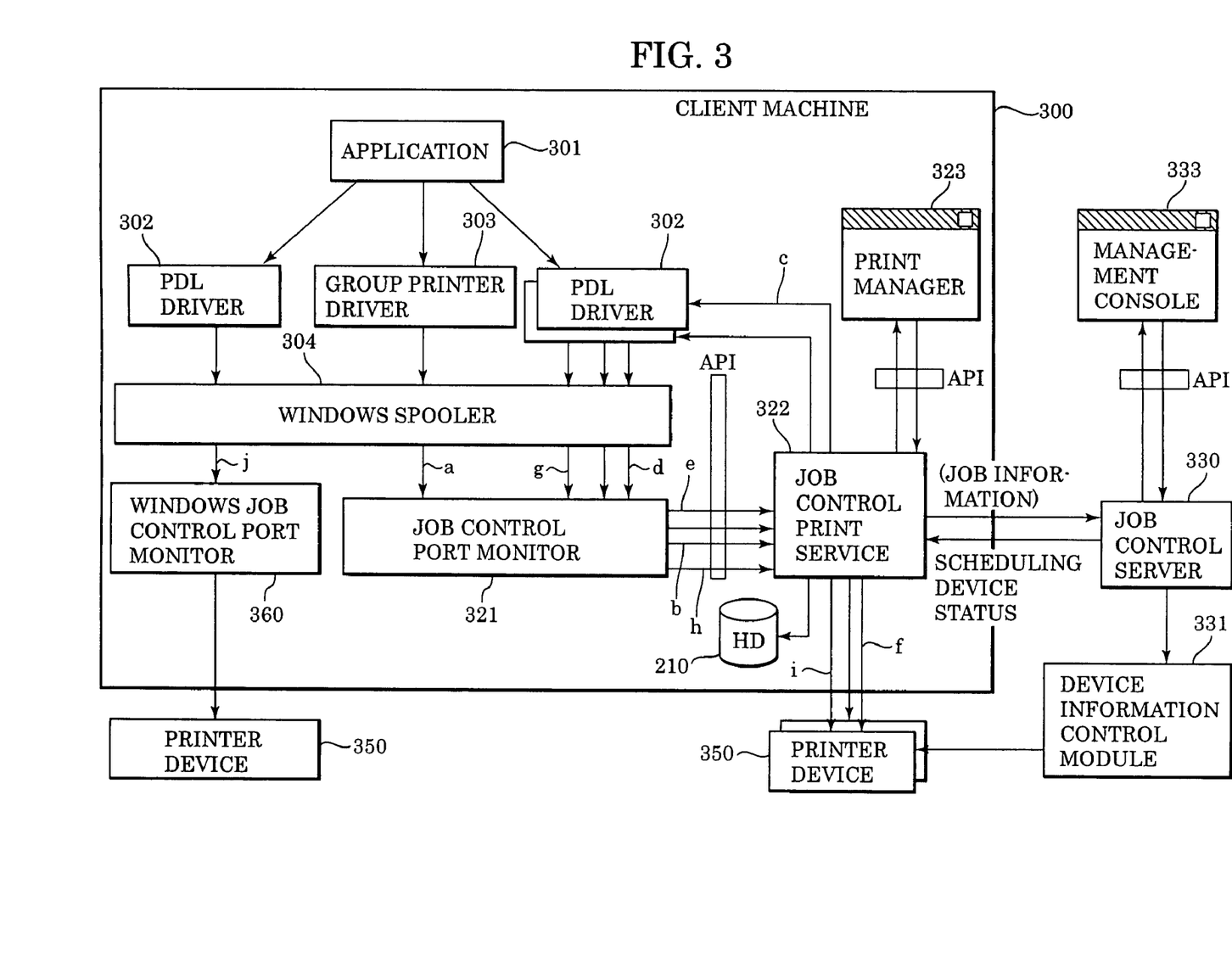
FIG. 3 is a block diagram of a print job control system according to the present invention.

FIG. 3 is a block diagram showing processing for a print job issued from application program in the client-server model in this system. More specifically, FIG. 3 shows how a print job issued from a typical application program, such as Microsoft Word®, is processed in a print job control system.

Referring to FIG. 3, a client machine 300 (corresponding to the personal computer (PC) 102) is a client machine on which a module for a print job control system runs.

Typically, in response to a print instruction, an application program 301 uses a graphics function of the OS to generate a series of drawing commands and passes the commands to a Windows® spooler 304 via a printer driver. The Windows® spooler 304 then takes a step for passing print job data to a port monitor selected by the user, so that the print job data is transmitted to a printer device.

In the present embodiment, the user pre-specifies a port monitor (hereinafter referred to as a "job control port monitor") 321 for the print job control system to give a print instruction. The application program 301 generates the series of drawing commands via the OS.

A PDL (page description language) printer driver 302 receives the drawing commands, generates print job data, and sends the print job data to the job control port monitor 321, rather than to a port monitor, via which print job data is transmitted to a printer device. The job control port monitor 321 transmits the print job data to a print service 322 (hereinafter referred to as a "job control print service") for the print job control system, rather than to the printer device 350. The job control print service 322 (which functions as a failure detecting unit in the present invention) has a function for managing a job/device state.

Further, when the device and the client PC operate mutually in a peer-to-peer connection environment, the job control print service 322 manages information, such as a device state and a job state that is sent from the device. The job control print service 322 also has a function for issuing a predetermined command. This corresponds to a function for managing device information and job information for the printer devices 350.

A print manager (hereinafter referred to as a "job control print manager") 323 for the print job control system functions as a failure recognizing unit in the present invention and is implemented by a program that provides a user interface (UI). With the job control print manager 323, the user can check the state of a print job in the job control print service 322 and/or can operate the print job.

The job control print manager 323 sends/receives information to/from the job control print service 322 via a software interface (API: application programming interface) of the job control print service 322. The job control print manager 323 also has a function for obtaining, as an event, state information of the external printer devices 350 managed by the job control print service 322. Types of event notifications may be, for example, a warning for low toner; error/warning information notifications for a communication failure between the client and the device, memory shortage, and a full output tray; and a notification for normal mode information when returning from an error state to a normal state.

The job control print service 322 has a function for monitoring statuses, such as a power control state and failure information (paper jamming) state, while each device (i.e., each printer device) that is capable of communication via the network 101 executes printing.

A management console 333 (hereinafter referred to as a job control management console) for the print job control system can monitor the entire print job control system by exchanging information/instructions with the job control print service 322 via a Job Control Server 330 using an API that allows access of software included in the job control print service 322.

Using a device information control module 331, the job control print service 322 communicates with each printer device 350, via Job Control Server 330 to obtain information regarding a print job in each printer device 350 and the operation state thereof and to operate each printer device 350.

Print Operation from Print Application 301

Next, printing from the print application program 301 in the present embodiment is described.

The PDL printer driver 302 converts a series of drawing commands generated by the application program 301 into a PDL file that can be interpreted by each printer device 350.

As described above, the PDL file is transferred to the job control port monitor 321 via the Windows® spooler 304 (as indicated by arrow a in FIG. 3) and is further transferred to the job control print service 322 (as indicated by arrow b in FIG. 3)

In accordance with the type of job control to be performed on the print job, the job control job control print service 322 controls an operation for the print job.

In the configuration shown in FIG. 3, when the job control print service 322 performs load distributed printing controls, the print job is transmitted to one of the printer devices 350 which becomes ready to receive it earlier than the others. Arrows c, d, e, and f indicate an example of how multiple print jobs are transmitted to the multiple printer devices 350 that can receive print jobs. Such load distributed printing control can be executed when the user specifies the job control port monitor 321 and a group printer driver 303 or the PDL printer driver 302 is used. The group printer driver 303 is provided by a group of PDL drivers 302. The group printer driver 303, however, is not directly relevant to the present invention, and thus details thereof are not described.

In a typical Windows® printing system, the PDL printer driver 302 converts a series of drawing commands generated by the application program 301 into a PDL file that can be interpreted by each printer device 350. As described above, the PDL file is transferred to a Windows® job control port monitor 360 via the Windows® spooler 304 (as indicated by arrow j in FIG. 3) and is further transferred to the printer device 350. This processing is executed when the user specifies the job control port monitor 360, corresponding to the printer device 350, to give a print instruction, rather than specifying the job control port monitor 321.

Relationship Between Windows® Printing System and Print Job

Figure 4:
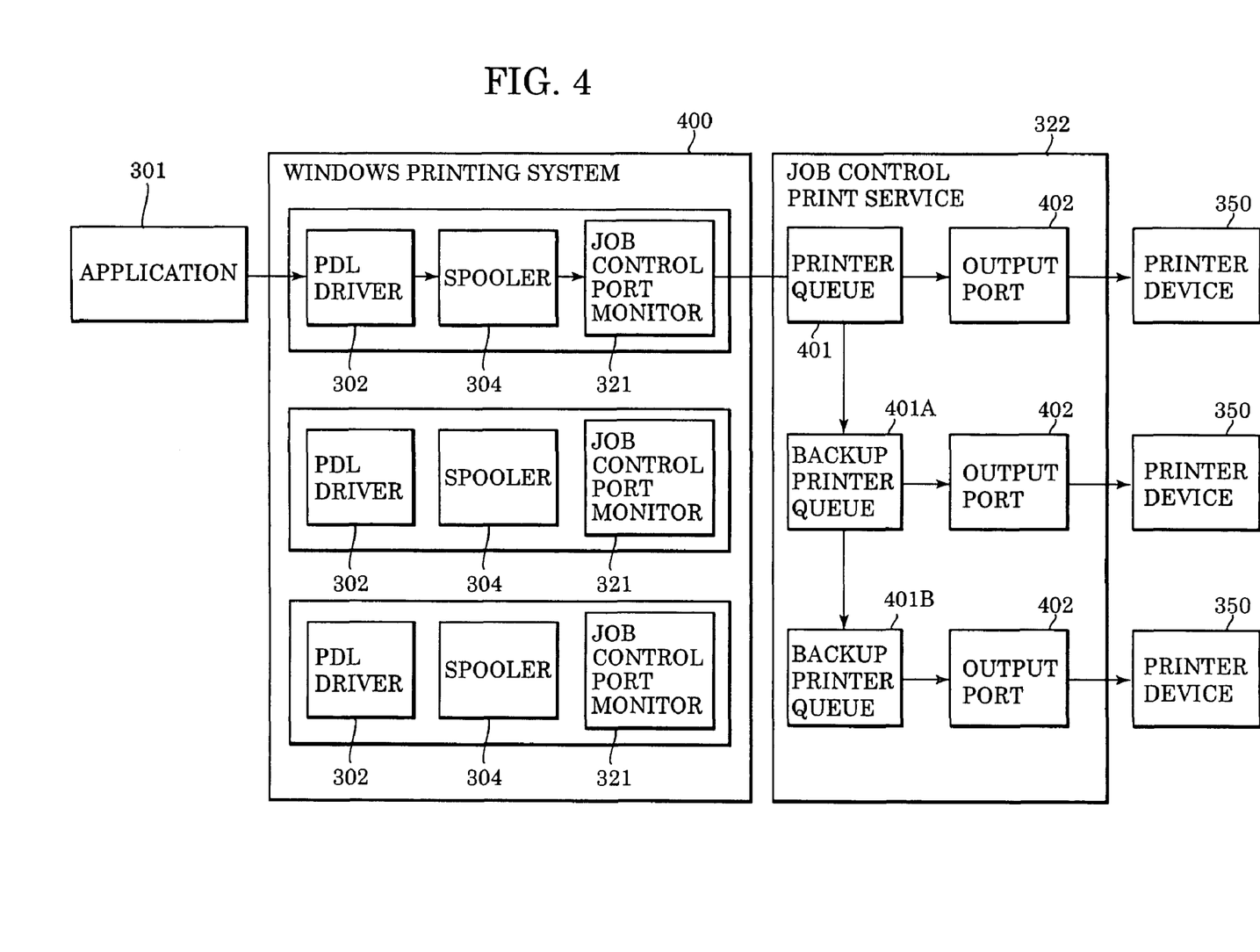
FIG. 4 is a block diagram illustrating the flow of print job processing in the print job control system according to the present invention.

Next, the relationship between a Windows®-based printing system and a print job in the print job control system is described, in conjunction with corresponding processing, in further detail with reference to FIG. 4.

The job control print service 322 in FIG. 4 corresponds to the print job control system in which a control program for the client machine 300 runs.

In the present embodiment, the job control print service 322 temporarily holds print job data and transmits the print job data to the printer device 350 corresponding to the PDL driver 302 selected by the application program 301.

Processing performed when the job control print service 322 performs load distributed printing, which is an added feature, is described next.

When the job control print service 322 performs load distributed printing, the user or the application program 301 issues a print job to a printer that has a load distributed printing feature, as described above.

The job control print service 322 receives, as a PDL file, the job data processed by the PDL driver 302 via the job control port monitor 321. Upon receiving the job data, the job control print service 322 temporarily holds the job data in its own printer queue 401. The job control print service 322 then forwards the job data to the printer device 350 corresponding to the printer queue 401 via a corresponding output port 402, or sorts the print data into a backup printer queue 401A or 401B and then forwards the job data to the corresponding printer device 350 via output port 402.

In such a printing system, the present invention is adapted to perform proxy processing when a print failure (i.e., error) occurs in a printer device to which a print job is issued. In particular, the present invention is directed to a printing system for performing control so as to perform manual proxying for predetermined errors (e.g., paper jamming and paper out). Thus, during the manual proxying, candidate printers that can perform proxy printing are displayed and the user selects a proxy destination therefrom. Individual embodiments hereinafter are based on this premise.

First Embodiment

A first embodiment of the proxy printing system is described next. In the first embodiment, when a print failure occurs in a printer device to which a print job is transmitted, a printer device that was selected for the previous proxy printing is displayed during the selection of a proxy print destination.

First, an example of a screen for selection and confirmation of a proxy printer device during manual proxying is described with reference to FIG. 5. When a failure occurs in a printer device to which a print job is issued, a corresponding PC receives a failure notification from the printer device and displays the exemplary screen shown in FIG. 5. The exemplary display shown in FIG. 5 includes an indication of a printer driver 501 that has output a print job to a printer device encountering a print failure. In this case, "iR C3200 186" is displayed as the printer driver 501. A control field 502 indicates a printer driver that was designated as the previous proxy print destination.

The control field 502 also indicates a printer device (or a printer driver that outputs a print job thereto) in accordance with a determination rule of a proxy print destination. A proxy change button 503 is used to change a proxy printer device displayed in accordance with a determination rule. Pressing the proxy change button 503 causes a proxy printer device to be displayed out of all printer devices, so that the user can change the proxy printer device. The present invention does not particularly restrict the display method and the selection method for such processing and known schemes may be used.

A proxy print button 504 is used to give an instruction for proxy printing to the printer device displayed in the control field 502. Pressing the proxy print button 504 causes actual proxy print processing to be started. The illustrated screen, however, is merely an example, and thus the present invention is not particularly limited thereto. For example, the control field 502 may take a form that displays a proxy printer device determined according a rule, in a selected state, while all printer devices are displayed.

Figure 5:
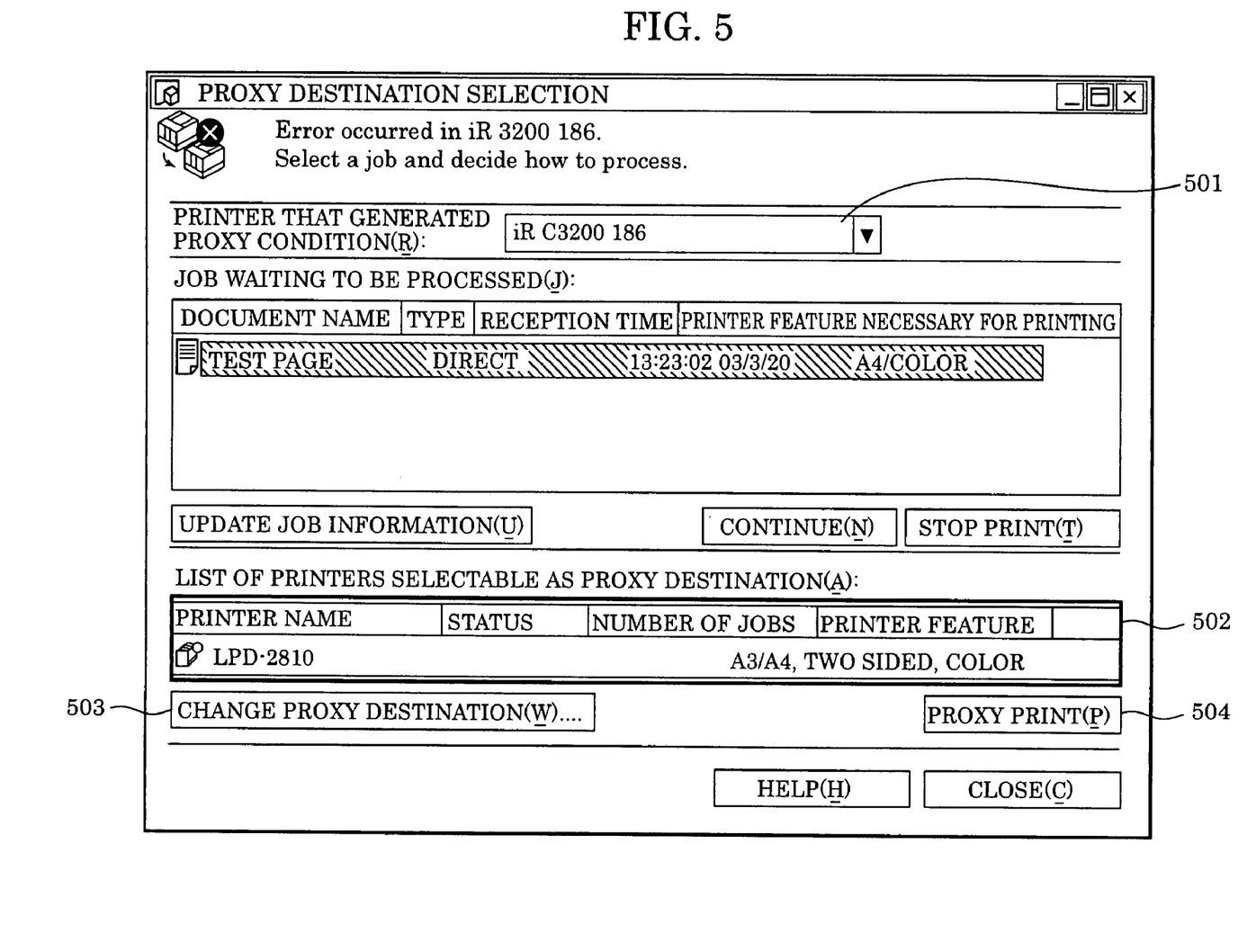
FIG. 5 shows a screen for selection of a printer driver during manual proxying in the present invention.
Figure 6:
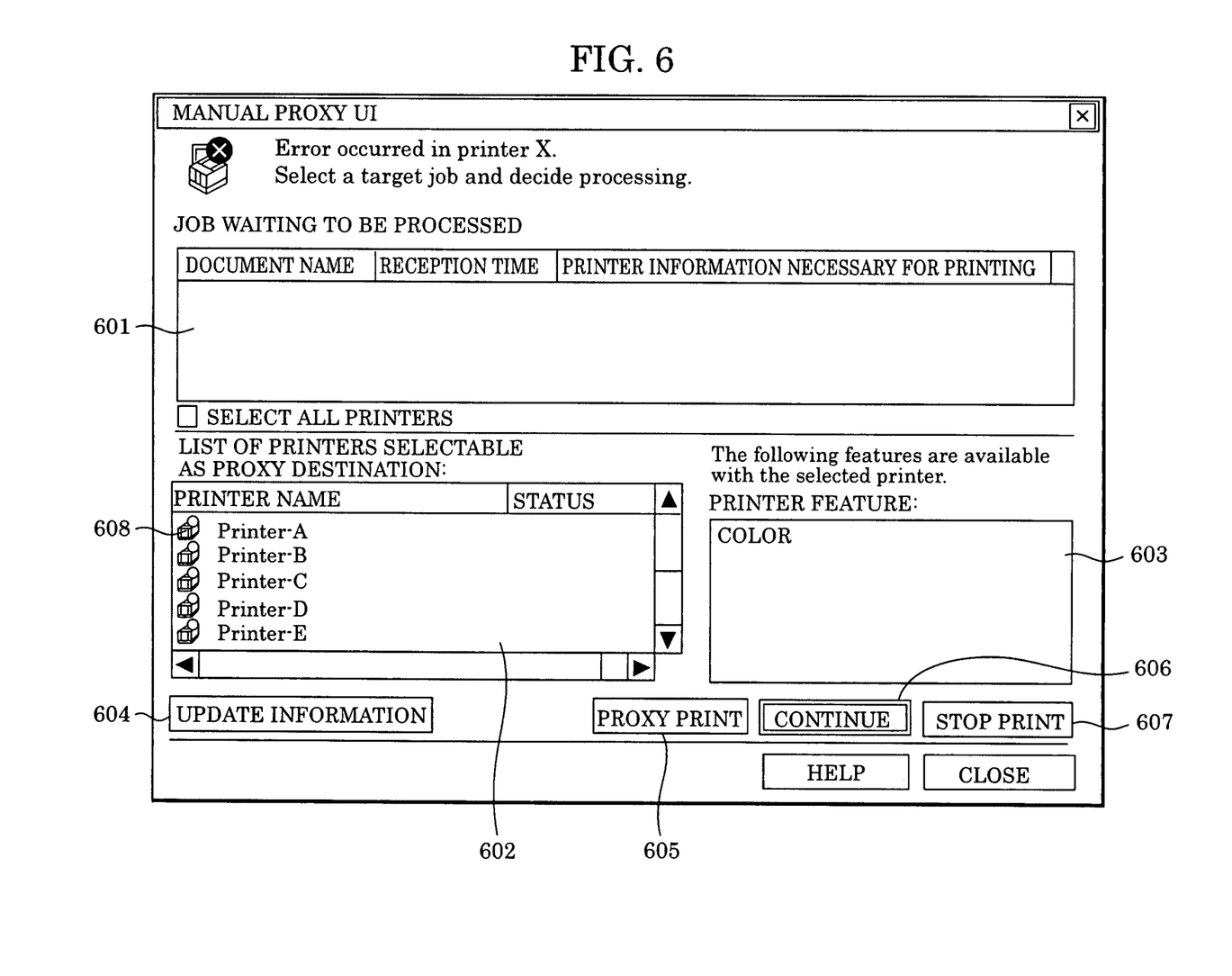
FIG. 6 shows an example of a screen displayed when the proxy change button shown in FIG. 5 is pressed.

FIG. 6 shows a user interface (UI) displayed when the proxy change button 503 shown in FIG. 5 is pressed. In FIG. 6, all printers that can perform printing (i.e., can perform proxy printing) are displayed.

Figure 7:
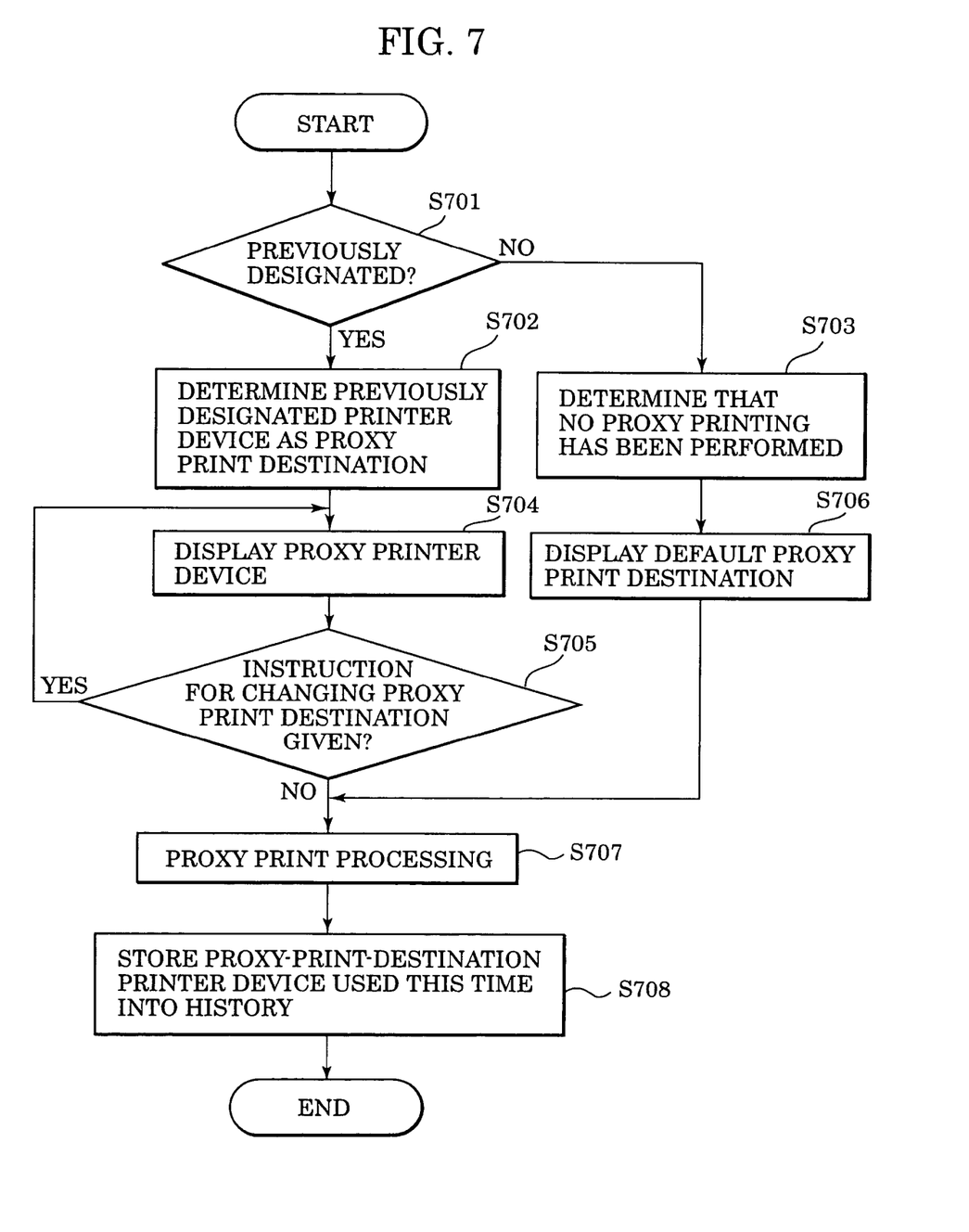
FIG. 7 is a flow chart showing an operation for notifying of a proxy candidate in a first embodiment.

FIG. 7 is a flow chart showing an example of operation of the first embodiment of the proxy printing system.

This flow chart shows the logic of sequential processing involving a process in which a print failure occurs in a printer device to which a job is issued from a PC, a process in which a printer device used as the previous proxy print destination is displayed as a proxy destination when the PC recognizes the failure, and a process in which proxy print destination history information is stored when a user gives a print instruction. In practice, this processing is followed by proxy print processing. Failure notification obtaining processing, which is initial processing in the flow, and the proxy print processing, which follows the flow, are not directly relevant to the present invention, and thus descriptions thereof are not particularly given. Also, the present invention does not particularly restrict the failure notification obtaining processing and the proxy print processing and thus known processing may be used therefor.

Referring to FIG. 7, first, in step S701, proxy print history for previous proxy printing exists for a printer device encountering a print failure. When the proxy print history exists, the process proceeds to step S702. On the other hand, when no proxy print history exists, the process proceeds to step S703, in which it is determined that no proxy printing has previously been performed. Whether a proxy printer has previously been designated is determined using, for example, a history information management table, such as the one shown in FIG. 10. The use of the history table shown in FIG. 10 allows determination as to whether or not a printer that has previously been designated as a proxy destination exists for a target printer. Alternatively, a table, such as the one shown in FIG. 11 may be used.

Since it is determined that no printer device is recommended as the current proxy print destination for this time, in step S706, a printer device set by default is displayed as a candidate for the proxy printer device. As a screen for displaying the candidate, for example, the screen shown in FIG. 5 is used.

When the process proceeds from step S701 to step S702, this means that it has been determined that proxy print history exists. Thus, in accordance with a proxy print destination determination rule of the present embodiment, the latest history (i.e., the previous value) of a print destination that has performed proxy printing for the printer device encountering a failure is determined as a printer device for proxy printing for this time.

Next, in step S704, the proxy printer device determined in step S702 is displayed on the manual proxy instruction screen shown in FIG. 5.

In step S705, a determination is made as to whether or not an "instruction for changing the proxy print destination" is given with respect to the printer device displayed (in step S704) as the proxy print destination in accordance with the determination rule of the present embodiment. When it is determined in step S705 that the instruction is given, processing for changing the proxy print destination is performed, and the process returns to step S704, in which a printer device selected as the proxy print destination after the change is displayed. In this case, the manual proxy user interface shown in FIG. 6 is displayed. When the user selects a proxy printer, the process proceeds from step S705 to step S707. In step S707, proxy print processing is executed. The process in step S704 in the present invention is merely intended to display a proxy printer device. Thus, for some reason, when the user wishes to change what is displayed, an arbitrary change can be made thereto.

Referring to FIG. 6, a job waiting to be processed field 601 indicates the state of each job waiting to be processed. A list of proxy destination printers 602 indicates printers that are selectable as a proxy destination. A printer feature field 603 indicates features of a printer selected. An update button 604 is used to obtain the latest information about a printer that can act as a proxy destination. A proxy print button 605 is used to give an instruction for proxy printing. A continue button 606 is used to give an instruction for causing the current printer to continue processing for the job waiting to be processed. A stop button 607 is used to stop printing. With a printer, e.g. Printer A 608, in the field 602 being selected as a proxy destination, when the proxy print instruction button 605 is pressed, the selected printer performs processing for the proxy printing. When the continue button 606 is pressed, the printer that has attempted to process the print job and has encountered a failure continues the processing. In the latter case, for example, when the user clears the failure of the failed printer (e.g., by removing jammed paper and loading paper in the case of paper out), that printer can continue the print processing.

On the other hand, when it is determined in step S705 that no "instruction for changing the proxy print destination" is given, i.e., "proxy printing" is to be performed, the process proceeds to step S707. In step S707, proxy print processing is performed. The proxy destination is, for example, the printer displayed in the field 502 shown in FIG. 5. Displayed in the field 502 is an example of a candidate default for the proxy print destination printer.

Subsequently, the process proceeds to step S708. In step S708, in response to the series of proxy print instructions and processing, proxy print information is stored as history. The proxy print information includes, at least, the printer device that failed, the printer device designated as the proxy print destination, and the date and time of processing. The proxy print information may include any other information, which is not limiting. Those pieces of information are stored as information for the determination (performed in step S701) in subsequent proxy print processing.

Figure 10:
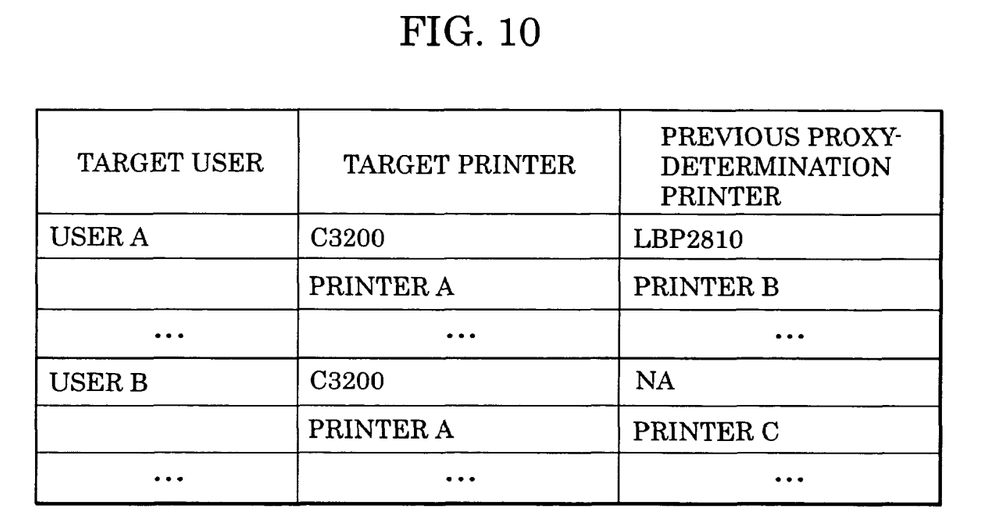
FIG. 10 shows a history information management table for use in the present invention, particularly, in the first embodiment.

The proxy print history can be expressed by a table as shown in FIG. 10. In FIG. 10, the "target printer" refers to a printer to which a job was issued and to which a failure occurred, and the "previous proxy destination printer" refers to a printer that was designated as a proxy destination and that executed proxy processing when the previous error occurred. As shown, the history information in FIG. 10 is managed for each user. Although the proxy destinations in the previous case are managed in FIG. 10, the present invention is not limited thereto and thus proxy history that is earlier than the previous case can be stored.

In accordance with the processing described above, a proxy print destination in the first embodiment of the proxy printing system is automatically displayed using the previous value, during occurrence of a print failure.

As described above, according to the first embodiment, for proxy printing when a print failure occurs in a printer device to which a print job is issued, a printer device that was used for the previous proxy printing can be automatically displayed. This can eliminate complicated processing, e.g., user designation of a proxy destination.

Second Embodiment

A second embodiment of the proxy printing system of the present invention is described next. In the second embodiment, when a print failure occurs in a printer device to which a print job is issued, a printer device is selected according to a determination rule, using the frequency of designation, from previous proxy print destinations of a printer device encountering a print failure and is displayed as a proxy printer device during the designation of a proxy print destination.

When a printer device that is different from an ordinary one is designated so as to perform proxy printing on an ad hoc basis in the first embodiment, the arrangement in the second embodiment can prevent the printer device that was changed and used on the ad hoc basis from being designated in next proxy printing.

The present embodiment, however, does not particularly restrict a coefficient or the like for the frequency of designation. Further, the history may include any number of pieces of data, such as the latest 100 pieces of data. In this case, what is important is a determination rule using the frequency of designation.

Figure 8:
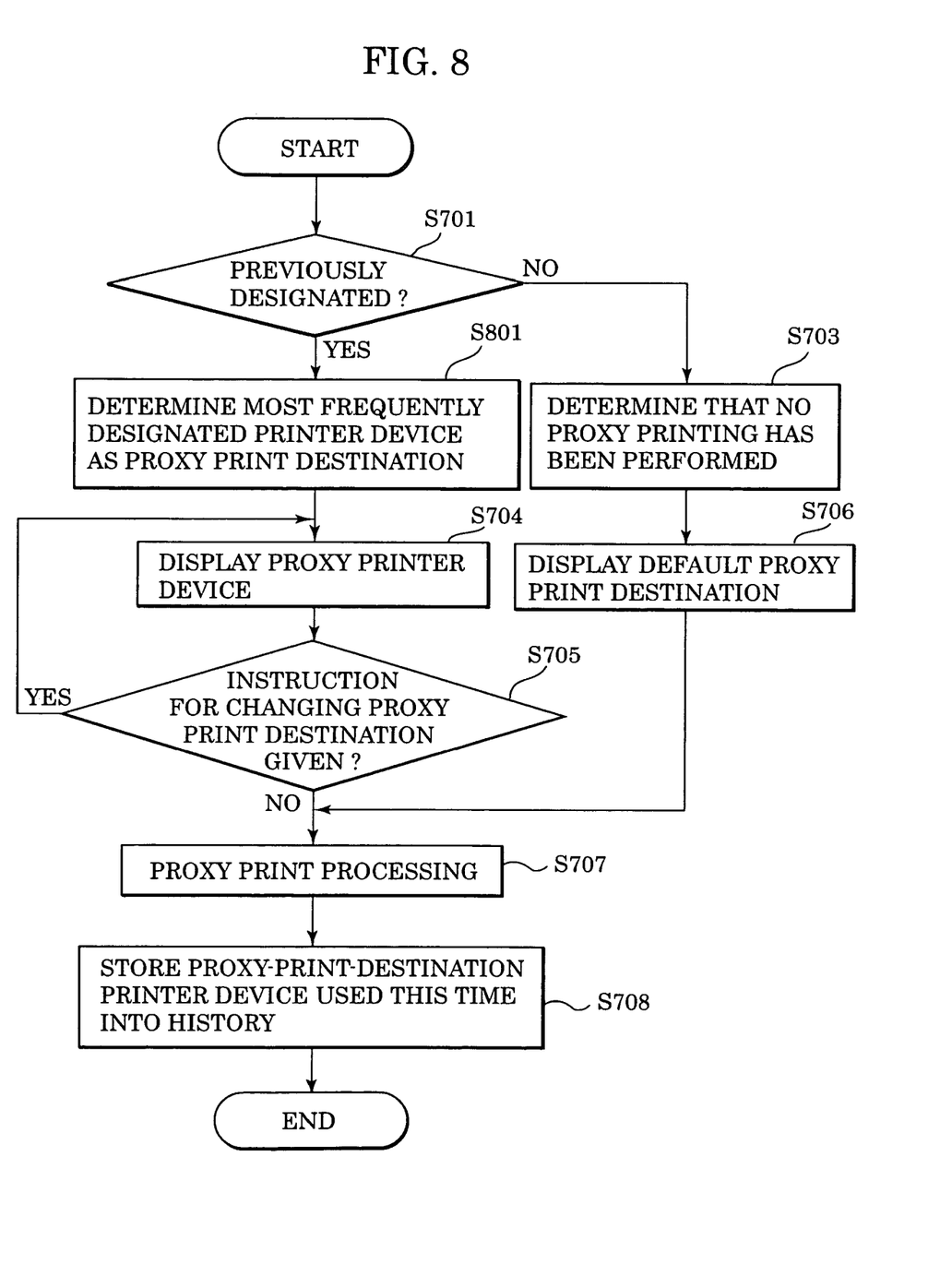
FIG. 8 is a flow chart showing an operation for notifying of a proxy candidate in a second embodiment.

FIG. 8 is a flow chart illustrating the operation of the second embodiment of the proxy printing system. This flow chart shows the logic of sequential processing involving a process in which a print failure occurs in a printer device to which a job is issued from a PC, a process in which the frequency of designation (i.e., use) of a proxy print destination is determined based on proxy print history when the PC recognizes the failure, a process in which a printer device that has a highest frequency of designation is displayed as a proxy printer device, and a process in which a proxy print destination is stored as history information when the user gives a print instruction. In practice, this processing is followed by the proxy print processing. As in the first embodiment, failure notification obtaining processing, which is the initial processing in the flow, and the proxy print processing, which follows the flow, are not directly relevant to the present invention, and thus descriptions thereof are not particularly given. Also, the present invention does not particularly restrict the failure notification obtaining processing and the proxy print processing and thus known processing may be used therefor.

The operation shown in FIG. 8 is initiated when an output end printer device fails to execute a print job.

Referring to FIG. 8, step S701 and steps S703 to S708 are analogous to those illustrated in FIG. 7, and thus the descriptions thereof are not given below. Step S702 shown in FIG. 7 is replaced with step S801.

In step S801, the proxy print history for the printer device that is currently encountering a failure is obtained, and a coefficient for the frequency of designation is used to determine, as the proxy printer device for this case, a printer device having the highest frequency of proxy printer device designation out of the obtained proxy print history. Thereafter, in step S704, information about the determined proxy printer device is displayed.

Figure 11:
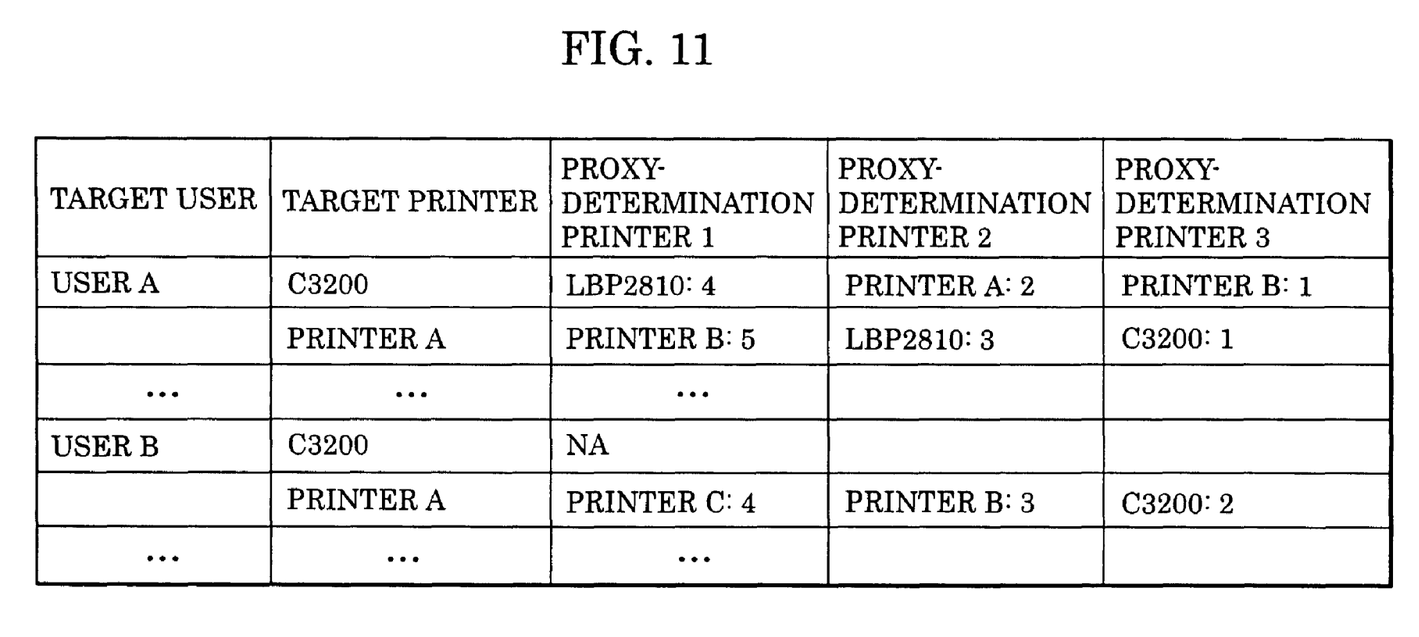
FIG. 11 shows a history information management table for use in the present invention, particularly, in the second embodiment.

In the second embodiment, as the history information management table, a table as shown in FIG. 11 may be used. In FIG. 11, for each user, proxy destination printers up to the third in decreasing order of the frequencies used as a proxy destination is shown with respect to each target printer. With regard to the frequency, the number of selections as a proxy is counted and is managed. In the second embodiment, the history table shown in FIG. 10 can also be used.

In accordance with the steps described above, a proxy printer device is determined through the use of the respective frequencies at which printers in the first embodiment of the proxy printing system are designated as a proxy print destination during occurrence of print failure, and automatic display processing is executed. As described above, according the second embodiment, when a printer device that is different from an ordinary one is designated so as to perform proxy printing on an ad hoc basis, it is possible to prevent the printer device that was changed and used on the ad hoc basis from being designated in next proxy printing, unlike a case in which the same proxy printer device designated last time is used. Thus, a printer device that issued a job can eliminate complicated processing, e.g., user designation, when performing proxy printing during the occurrence of a print failure.

Third Embodiment

A third embodiment of the proxy printing system is described next. In this embodiment, when a proxy printer device determined in accordance with each determination rule based on the proxy print history illustrated in the first and second embodiments cannot be used due to an error or the like or is already eliminated, the proxy printer device is excluded and a proxy printer device is determined again according to each determination rule. The error may be, for example, "paper out", "toner out", and "paper jam", and may be any event that results in a determination that the proxy print processing cannot be performed. The arrangement may be such that those types of errors can be pre-set. The arrangement may also be such that not just an error but also another cause can be used to determine that printing cannot be performed. Examples of such a cause include a case in which a printer device is operable but cannot perform printing immediately because of the high number of jobs, e.g., more than 100 jobs, that are stacked in the queue.

Figure 9:
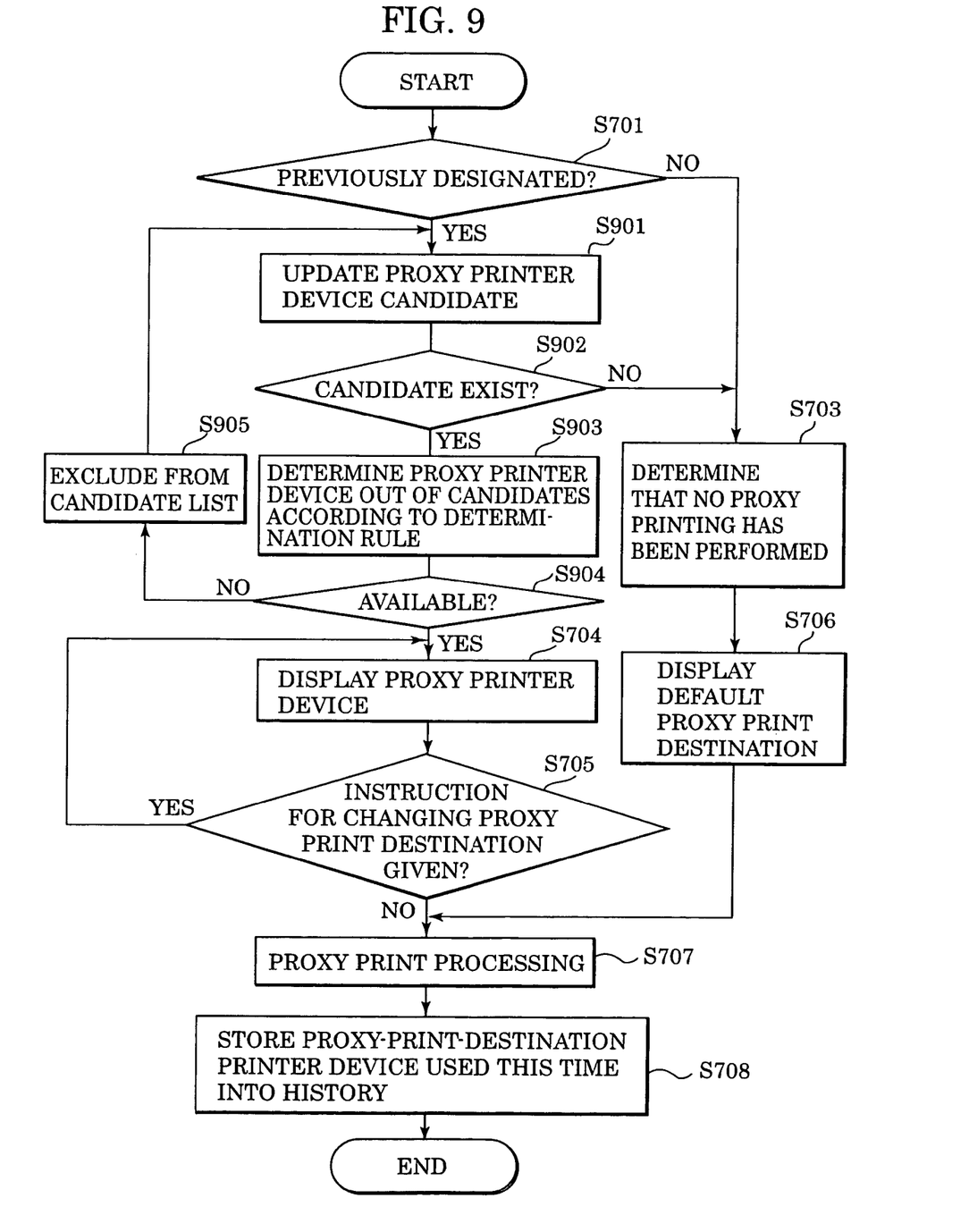
FIG. 9 is a flow chart showing an operation for notifying of a proxy candidate in a third embodiment.

FIG. 9 is a flow chart illustrating the operation of the third embodiment of the proxy printing system. As in the flow charts in the first and second embodiments, the flow chart shown in FIG. 9 shows the logic of sequential processing involving a process in which a print failure occurs in a printer device to which a job is issued from a PC, a process in which a proxy print destination is determined/displayed according to a determination rule when the PC recognizes the failure, and a process in which a proxy print destination is stored as history information when the user gives a print instruction. This processing, however, is characterized in that, when a printer device that cannot perform printing is selected, a determination for a proxy printer device is made again, excluding the selected printer device, in accordance with the determination rule.

The operation shown in FIG. 9 is initiated when a failure occurs in an output end printer device during the execution of a printer job.

Since the processing in steps S701 and S703 to S708 (i.e., other than step S702) shown in FIG. 9 are analogous to those in FIG. 7, descriptions thereof are not given below.

Thus, when a printer device that encounters a print failure has proxy print history in S701, processing in step S901 is performed. In step S901, processing for listing printer devices stored in the proxy print history is performed. When the process returns from step S905 described below, the candidate excluded this time is not used to update the list.

Next, in step S902, a determination is made as to whether or not the number of candidates updated in step S901 is zero. Although at least one candidate exists initially, this determination is made based on the consideration that the number of candidates eventually becomes zero due to looping back via step S905. If no candidate exists, the process proceeds to step S703, in which it is determined that no candidate based on the proxy print destination determination rule is displayed this time.

On the other hand, when at least one candidate exits in step S902, the process proceeds to step S903. In step S903, a proxy printer device is determined according to the determination rule described in the first or second embodiment.

Next, in step S904, the current state of the printer device determined in step S903 is obtained and a determination is made as to whether or not the printer device is currently available. When it is determined that the printer device is available in step S904, the process proceeds to processing for displaying the printer device determined in step S903 (the description of the subsequent processing is omitted).

On the other hand, when it is determined in step S904 that that printer device is not available, the process proceeds to step S905.

In step S905, processing for excluding the printer device is performed for the current proxy print processing, since the proxy printer device determined in step S903 was determined to be unavailable. Subsequently, the process returns to step S901.

Steps S901 to S905 described above are repeated. When it is determined in step S902 that no candidate exists or it is determined in step S904 that the proxy printer device determined in step S904 is available, the process proceeds to the exit of the loop.

In accordance with the steps described above, the processing for creating and displaying the list of proxy print destination candidates is performed in the third embodiment of the proxy printing system.

As the history table for the history information management, either of the tables shown in FIGS. 10 and 11 may be used.

As described above, according to the third embodiment, when proxy printing is performed during the occurrence of a print failure, a printer device that has issued a job can reliably use a printer device that is determined as a proxy printer device, in addition to the processing described in the first and second embodiments. This can achieve a desired manual proxy print processing without the user having to intentionally check the state of the printer device.

During proxy print processing performed when a print failure occurs in a printer device connected over a network, the proxy printing system having the above-described configuration according to the present invention can operate efficiently. That is, when a proxy destination printer device is designated thorough manual proxying, a proxy printer device can be presumed based on the user's operation history to allow a desired printer device to be displayed.

In addition, the current state information of each printer device may be included in the proxy printer device determination rule using the history. Such an arrangement can provide a proxy printing system that can display a proxy print destination printer device without the user having to recognize (determine) not only the frequency of use but also the availability of the displayed printer device.

Modifications

The processing in each embodiment can be achieved by supplying a storage medium storing software program code for accomplishing each feature to the system or apparatus so that the computer (or the central processing unit (CPU) or a micro-processing unit (MPU)) of the system or apparatus reads and executes the program code. In such a case, the program code that is read from the storage medium achieves the features of the embodiments and the storage medium in which the program code is stored is also encompassed by the present invention. Examples of available recording media for supplying the program code include a floppy disk, hard disk, optical disk, magnetic optical disk, ROM (read only memory), CD-ROM (compact disk ROM), CD-R (compact disk-recordable), DVD-ROM (digital versatile disk ROM), magnetic tape, and nonvolatile memory card.

Further, not only is the program code that is read from the computer executed to achieve the features of each embodiment, but also an OS (operating system) or the like that is running on the computer may perform part or all of the actual processing in accordance with instructions of the program code to achieve the features of the embodiment.

Additionally, after the program code read from the recording medium is stored in a memory that is provided in a plug-in board inserted to the computer or an expansion unit connected to the computer, a CPU or the like that is provided in the plug-in board or the expansion unit may perform part or all of the actual processing in accordance with an instruction of the program code to achieve the features of each embodiment. Such an arrangement is also encompassed by the present invention.

The proxy printing system having the above-described configuration according to the present invention uses proxy print processing history to perform proxy print processing when a print failure occurs in a printer device connected over a network. This arrangement can automatically display a proxy print destination desired by the user during manual proxy designation. This arrangement, therefore, can provide a proxy printing system that can eliminate complicated processing, e.g., the user having to designate a proxy print destination every time.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2003-405030 filed Dec. 3, 2003, which is hereby incorporated by reference herein.

What is claimed is:

1. An information processing apparatus for a proxy printing system that performs processing for, when a print job is transmitted to a printer among a plurality of printers connected over a network and a print failure occurs in the printer, causing a proxy printer among the plurality of printers to perform proxy printing on the print job, the information processing apparatus comprising:

failure recognizing means for recognizing failure of the printer;

history managing means for managing history information of the printer, the history information including information identifying the proxy printer previously used as a proxy destination for each printer, in association with information identifying an original printer;

proxy history detecting means for detecting, at least one proxy printer previously used as the proxy destination for the printer for which failure was recognized by the failure recognizing means, according to the history information managed by the history managing means;

selection means for displaying at least one of the proxy printers detected by the proxy history detecting means in a manual instruction screen and for selecting the proxy printer to be used as the proxy destination for the printer for which failure was recognized by the failure recognizing means via the manual instruction screen;

proxy print processing controlling means for performing control to perform proxy print processing using one of the at least one of the proxy printers selected by the selection means; and history updating means for updating the history information of the printer managed by the history managing means according to the proxy printer used by the proxy print processing controlling means and the printer for which failure was recognized by the failure recognizing means.

2. The information processing apparatus according to claim 1, wherein the history updating means updates the history of the printer managed by the history managing means after the proxy print processing is executed.

3. The information processing apparatus according to claim 1, wherein when the proxy history detecting means determines that there is no printer that has previously proxied for the printer, the proxy print processing controlling means performs control to perform the proxy print processing using a default proxy printer.

4. The information processing apparatus according to claim 1, wherein the selection means issues an instruction for changing the proxy printer detected by the proxy history detecting means.

5. The information processing apparatus according to claim 1, wherein the history managing means manages history information of a printer that executed proxy print processing when a failure previously occurred in the printer; and the selection means displays the proxy printer that executed the proxy print processing when the failure previously occurred in the printer.

6. The information processing apparatus according to claim 1, wherein the history managing means manages, as history information, a frequency of designation of a printer that executed the proxy print processing when failures previously occurred in the printer; and the selection means displays the proxy printer based on the frequency of designation of the printer that executed the proxy print processing when the failures previously occurred in the printer.

7. The information processing apparatus according to claim 1, further comprising:
   state information obtaining means for detecting a state of the printer selected by the selection means as the proxy printer and for obtaining the detected state of the printer as the state information; and
   proxy printer updating means for excluding a printer that is unable to execute proxy print processing in accordance with the state information and updating information regarding the proxy printer.

8. A proxy print controlling method that performs processing for, when a print job is transmitted to a printer among a plurality of printers connected over a network and a print failure occurs in the printer, causing a proxy printer among the plurality of printers to perform proxy printing on the print job, the proxy print controlling method comprising:
   recognizing failure of the printer attempting to process the print job;
   managing history information of the printer, the history information including identification information identifying the proxy printer previously used as the proxy destination for each printer, in association with information identifying an original printer;
   detecting, at least one proxy printer previously used as a proxy destination for the printer of which failure is detected, according to the history information;
   displaying at least one of the detected proxy printers in a manual instruction screen;
   selecting a proxy printer to be used as a proxy destination for the printer for which failure was recognized;
   performing control to perform proxy print processing using one of the at least one proxy printers selected; and
   updating the history information of the printer according to the proxy printer used by the controlled proxy print processing and the printer for which failure was recognized.

9. The proxy print controlling method according to claim 8, wherein, when it is determined no printer has previously proxied the printer, the proxy print processing is performed using a default proxy printer.

10. The proxy print controlling method according to claim 8, further comprising issuing an instruction for changing the printer notified as the proxy printer.

11. The proxy print controlling method according to claim 8, wherein the history information of the printer comprises a frequency of designation of the printer that executes the proxy print processing when failure occurs in the printer; and displaying the proxy printer based on the frequency of designation of the proxy printer that executes the proxy print processing when failure occurs in the printer.

12. The proxy print controlling method according to claim 8, further comprising: detecting a state of the printer selected as the proxy printer and obtaining the detected state as state information; and excluding a printer that is unable to execute the proxy print processing in accordance with the state information and updating information regarding the proxy printer.

13. A computer-readable medium having a proxy print control program stored thereon which when executed by a proxy print controlling apparatus performs the proxy print controlling method of claim 8.

* * * * *